US010868972B2

(12) United States Patent
Sugawara

(10) Patent No.: US 10,868,972 B2
(45) Date of Patent: Dec. 15, 2020

(54) IMAGE CAPTURING APPARATUS, CONTROL METHOD THEREOF, AND STORAGE MEDIUM

(71) Applicant: CANON KABUSHIKI KAISHA, Tokyo (JP)

(72) Inventor: Atsushi Sugawara, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 24 days.

(21) Appl. No.: 16/421,642

(22) Filed: May 24, 2019

(65) Prior Publication Data

US 2019/0373160 A1 Dec. 5, 2019

(30) Foreign Application Priority Data

May 31, 2018 (JP) .................................. 2018-105312

(51) Int. Cl.
*H04N 5/235* (2006.01)
*H04N 5/232* (2006.01)

(52) U.S. Cl.
CPC ......... *H04N 5/2357* (2013.01); *H04N 5/2351* (2013.01); *H04N 5/23245* (2013.01)

(58) Field of Classification Search
CPC ............. H04N 5/23245; H04N 5/2351; H04N 5/2353; H04N 5/2357
See application file for complete search history.

(56) References Cited

U.S. PATENT DOCUMENTS

| 2014/0333799 | A1* | 11/2014 | Nakagawara | ........ | H04N 5/2357 |
| | | | | | 348/228.1 |
| 2016/0006919 | A1* | 1/2016 | Aoyama | ................... | G01J 1/28 |
| | | | | | 348/226.1 |
| 2017/0041522 | A1* | 2/2017 | Nakagawara | ........ | H04N 5/2357 |
| 2019/0289190 | A1* | 9/2019 | Kunishige | ........... | H01L 27/1464 |

FOREIGN PATENT DOCUMENTS

JP 2014-220764 A 11/2014

\* cited by examiner

*Primary Examiner* — Daniel M Pasiewicz
(74) *Attorney, Agent, or Firm* — Cowan, Liebowitz & Latman, P.C.

(57) ABSTRACT

An image capturing apparatus comprises an image capturing device, a flicker detection unit that detects a cycle of change of brightness in the flicker and a peak timing, and a control unit that switches between a first flicker reduction continuous shooting operation, in which, in a case where flicker is present, the image capturing device is caused to capture images in accordance with the peak timing while causing the flicker detection unit to detect the peak timing between frames in continuous shooting, and a second flicker reduction continuous shooting operation in which the image capturing device is caused to capture images in accordance with the peak timing without causing the flicker detection unit to detect the peak timing between frames in continuous shooting.

14 Claims, 13 Drawing Sheets

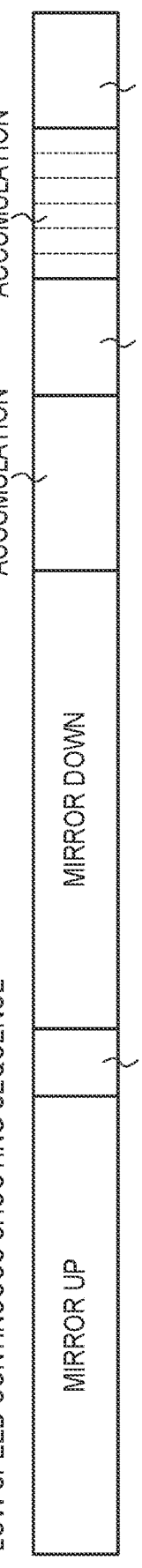
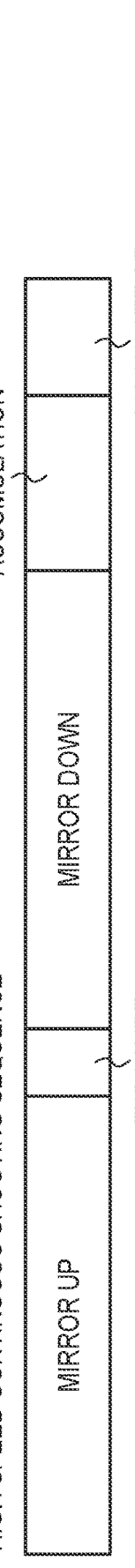
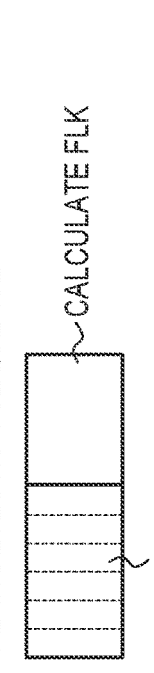
FIG. 2A S1 SEQUENCE
FIG. 2B LOW SPEED CONTINUOUS SHOOTING SEQUENCE
FIG. 2C HIGH SPEED CONTINUOUS SHOOTING SEQUENCE
FIG. 2D PEAK DETECTION SEQUENCE

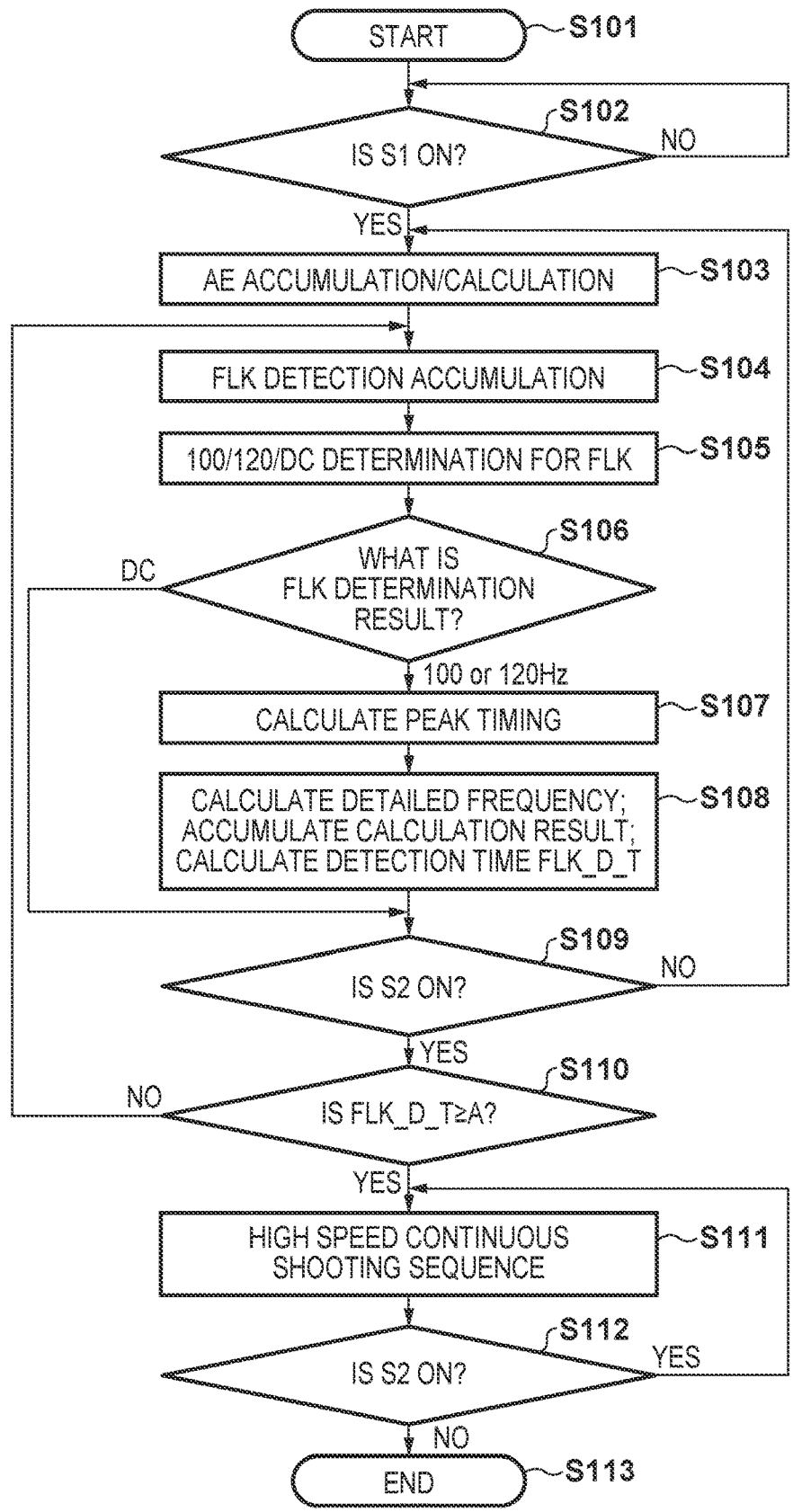

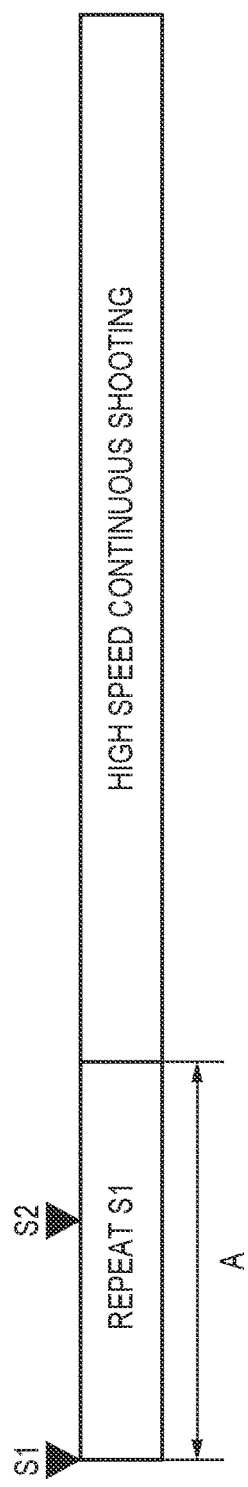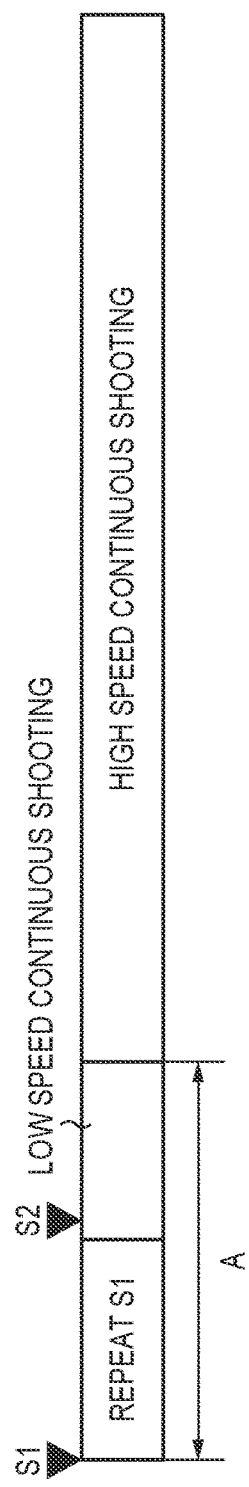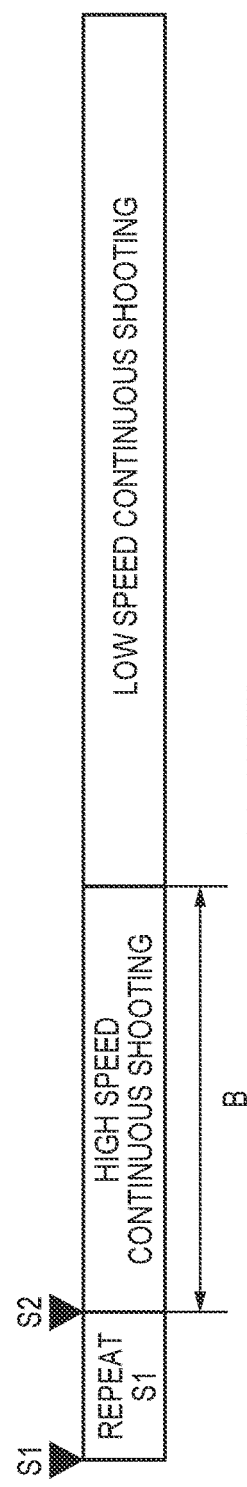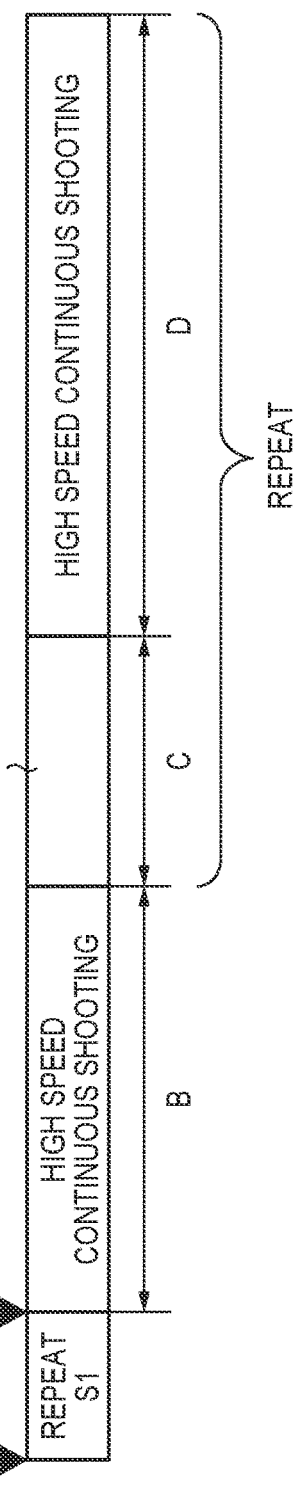

FIG. 7

| | PEAK TIMING CALCULATION RESULT (INTERNAL COUNTER VALUE) | PEAK INTERVAL ms | NUMBER OF FLICKER CRESTS | FLICKER CYCLE ms | FLICKER FREQUENCY Hz |
|---|---|---|---|---|---|
| 1ST TIME | 100000 | | | | |
| 2ND TIME | 169900 | 69.900 | 7 | 9.9857 | 100.1431 |
| 3RD TIME | 249792 | 79.892 | 8 | 9.9865 | 100.1352 |
| 4TH TIME | 329680 | 79.888 | 8 | 9.9860 | 100.1402 |
| 5TH TIME | 399581 | 69.901 | 7 | 9.9859 | 100.1416 |
| 6TH TIME | 479471 | 79.890 | 8 | 9.9863 | 100.1377 |
| 7TH TIME | 549378 | 69.907 | 7 | 9.9867 | 100.1330 |
| 8TH TIME | 629266 | 79.888 | 8 | 9.9860 | 100.1402 |
| 9TH TIME | 699163 | 69.897 | 7 | 9.9853 | 100.1474 |
| 10TH TIME | 779056 | 79.893 | 8 | 9.9866 | 100.1339 |
| 11TH TIME | 848968 | 69.912 | 7 | 9.9874 | 100.1259 |

IDEAL TIMING

TIMING EARLIER THAN IDEAL

TIMING SLOWER THAN IDEAL

IMAGE CAPTURING APPARATUS, CONTROL METHOD THEREOF, AND STORAGE MEDIUM

BACKGROUND OF THE INVENTION

Field of the Invention

The present invention relates to a technique for suppressing unevenness of exposure that occurs in image capturing apparatuses such as digital cameras or the like due to the flicker of natural light when shooting.

Description of the Related Art

With increasing high sensitivity of digital cameras in recent years, high speed shutters are able to release even under artificial light sources in which flicker occurs. While a high speed shutter has the advantage of being able to capture a photo in which blurring is not conspicuous when photographing indoor sports or the like, sometimes unevenness of exposure or unevenness of color occurs in the image between frames or within a single frame under artificial light sources in which flicker occurs.

In regard to these issues, methods are known for reducing the effect of flicker by detecting flicker and performing exposure at a peak timing of flicker, where the change in contrast of the light source is smallest. The frequency of flicker is twice the frequency of commercial power sources, and is therefore a frequency of either 100 Hz or 120 Hz. Accordingly, in performing exposure at the peak position of flicker, the base frequency (100 Hz or 120 Hz) of flicker and the peak timing are detected in advance, and exposure is performed in synchronization with the peak timing of flicker.

If peak timing is detected once, as new peaks appear one after the other in each cycle of flicker from the detected peak timing, ideally it is sufficient for the detection operation to be performed once only and for exposure to be performed in synchronization with a timing of a multiple of the flicker cycle. However, it is known that a fluctuation in a range of approximately ±0.3 Hz exists in the frequency of Japan's commercial power supply with respect to a standard 50 Hz or 60 Hz. The frequency of flicker is twice the frequency of commercial power sources, and therefore the frequency of light source flicker becomes either 100±0.6 Hz or 120±0.6 Hz. Thus, in fact, if the operation of detecting peak timing is not performed periodically, a problem occurs in that a gradual shift emerges and a desired image cannot be obtained.

In regard to this problem, for example, Japanese Patent Laid-Open No. 2014-220764 discloses an image capturing apparatus that switches between a first operational mode, which, although it takes time, is able to detect both the frequency and phase of flicker, and a second operational mode, which takes less time than the first operational mode, but is able to detect only the phase. In particular, in continuous shooting operations, to suppress occurrences of the above-described problem and reductions in continuous shooting speeds, the flicker peak is detected with the second operational mode in the intervals between continuous shooting operations.

However, with the conventional technique disclosed in the above-mentioned Japanese Patent Laid-Open No. 2014-220764 there is a problem in that, since detection of peak timing is performed in the second operational mode in the intervals between continuous shooting operations, the speed is reduced more than the continuous shooting speed when flicker detection is not carried out.

SUMMARY OF THE INVENTION

The present invention has been made in consideration of the aforementioned problems and provides an image capturing apparatus that enables high speed continuous shooting photography even while reducing the effect of flicker in the photographic images.

According to a first aspect of the present invention, there is provided an image capturing apparatus comprising: an image capturing device that captures a subject image, at least one processor or circuit configured to function as the following units: a flicker detection unit that along with detecting flicker of a light source, detects a cycle of change of brightness in the flicker and a peak timing, which is a timing at which brightness peaks, and a control unit that, according to a predetermined condition pertaining to a shooting start instruction by a user, switches between a first flicker reduction continuous shooting operation, in which, in a case where flicker is present, the image capturing device is caused to capture images in accordance with the peak timing while causing the flicker detection unit to detect the peak timing between frames in continuous shooting, and a second flicker reduction continuous shooting operation in which the image capturing device is caused to capture images in accordance with the peak timing without causing the flicker detection unit to detect the peak timing between frames in continuous shooting.

According to a second aspect of the present invention, there is provided a control method of an image capturing apparatus, for controlling an image capturing apparatus including an image capturing device that captures a subject image, and a flicker detection unit that along with detecting flicker of a light source, detects a cycle of change of brightness in the flicker and a peak timing, which is a timing at which brightness peaks, the method comprising: controlling such that, according to a predetermined condition pertaining to a shooting start instruction by a user, switching is performed between a first flicker reduction continuous shooting operation, in which, in a case where flicker is present, the image capturing device is caused to capture images in accordance with the peak timing while causing the flicker detection unit to detect the peak timing between frames in continuous shooting, and a second flicker reduction continuous shooting operation in which the image capturing device is caused to capture images in accordance with the peak timing without causing the flicker detection unit to detect the peak timing between frames in continuous shooting.

Further features of the present invention will become apparent from the following description of exemplary embodiments (with reference to the attached drawings).

BRIEF DESCRIPTION OF THE DRAWINGS

FIGS. 2A to 2D show shooting sequences in embodiments of the present invention.

FIG. 5 is a flowchart showing a continuous shooting operation in a first embodiment.

FIGS. 6A to 6D are timing charts of shooting operations in embodiments of the present invention.

FIG. 7 is a diagram for describing a method for calculating precise frequency of flicker.

DESCRIPTION OF THE EMBODIMENTS

First Embodiment

Figure 1:
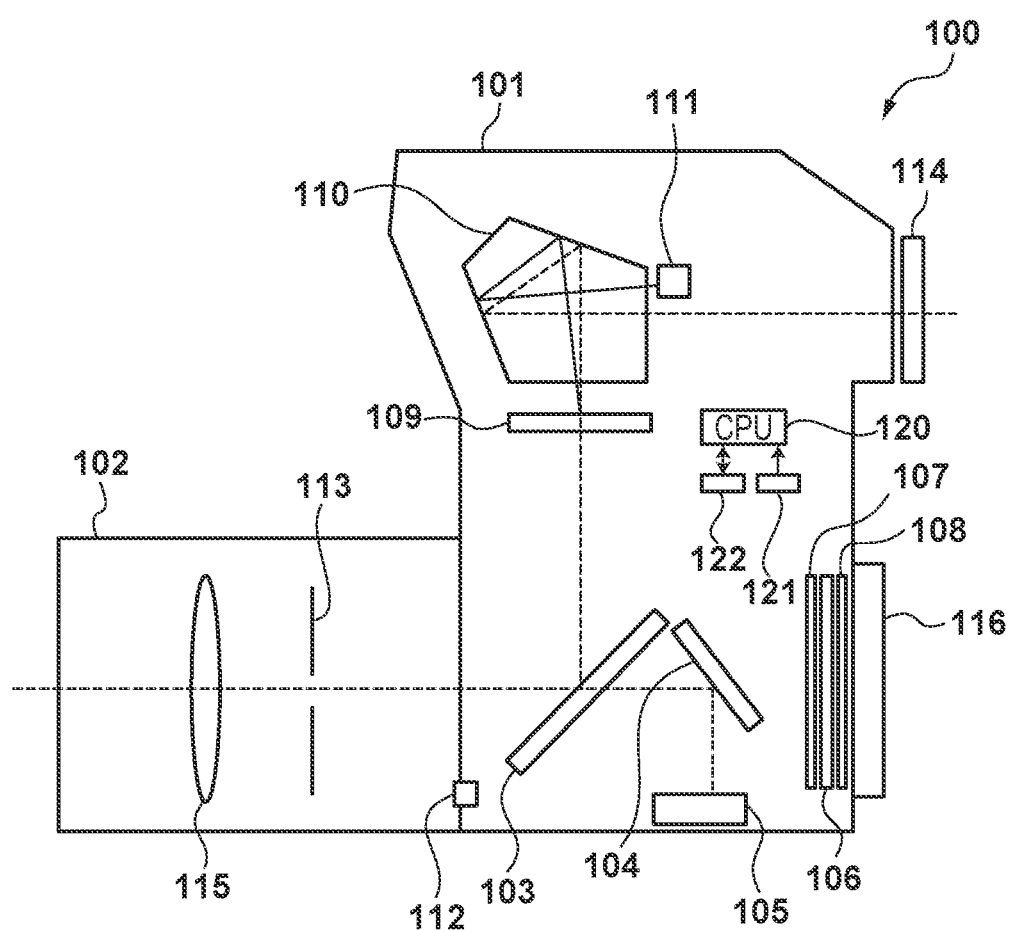
FIG. 1 is a lateral cross-sectional view showing a structure of a digital single lens reflex camera, which is a first embodiment of an image capturing apparatus according to the present invention.

FIG. 1 is a lateral cross-sectional view showing a structure of a digital single lens reflex camera 100, which is a first embodiment of an image capturing apparatus according to the present invention. In FIG. 1, the digital single lens reflex camera 100 is provided with a camera body 101 and a photographic lens 102 mounted on a front surface thereof. The photographic lens 102 is replaceable and is electrically connected to the camera body 101 via a mount contact point group 112. Further still, a diaphragm 113 is arranged inside the photographic lens 102 and is able to adjust the amount of light going into the camera. Furthermore, focus adjustments can be performed for the subject image by moving a focusing lens 115 along an optical axis.

A main mirror 103 is configured from a half mirror. The main mirror 103 is provided tilted on the photographic optical path when observed from a finder, and photographic light beams from the photographic lens 102 are reflected to a finder optical system. On the other hand, some of the light penetrates the main mirror 103 and is incident on an AF sensor 105 via a sub mirror 104. It should be noted that the main mirror 103 and the sub mirror 104 retract to outside the photographic optical path during shooting.

The AF sensor 105 performs focal point detection using a phase difference detection method. Focal point detection based on a phase difference method is a commonly known technique, and therefore description is omitted regarding details here of specific control. It should be noted in brief that automatic focus adjustments are performed by forming a second imaging surface of the photographic lens 102 on a focal point detection line sensor to detect the focus adjustment state of the photographic lens 102, then driving a focusing lens 115 based on the detection result. A low pass filter 106, an imaging device 108, and a focal plane shutter 107 are arranged behind the main mirror 103.

A focusing screen 109 is arranged at a planned imaging surface of the photographic lens 102 and configures a finder optical system. A pentaprism 110 changes the optical path for the finder. By observing the focusing screen 109 via an eyepiece 114, a photographer can confirm a photographic screen as indicated by a dashed line. Furthermore, an AE sensor 111 performs light measurements for determining exposure as well as performing flicker detection. The AE sensor 111 can measure the brightness of an object by receiving light from the focusing screen as indicated by a solid line. Detailed description is given later in regard to a flicker detection method.

A display unit 116 is generally configured by a liquid crystal panel and is configured so as to enable observation of conditions of an object by displaying in real time an image photographed by a photographer or image signals obtained by the imaging device 108.

A CPU 120 performs overall control of the digital single lens reflex camera 100 by expanding in a RAM 122 then executing a program stored in a ROM 121.

Furthermore, the digital single lens reflex camera 100 of the present embodiment has a release button that is not shown in the diagram. The release button is a two stage pressing system switch having a half-press and a full-press state. By performing a half-press of the release button, preparatory operations prior to shooting can be performed such as an AE operation (light measurement operation) and an AF operation (automatic focus adjustment operation), and by performing a full-press, the imaging device 108 is exposed such that photographic processing can be performed. Hereafter, a half-press state is referred to as a state in which S1 is ON, and a full-press state is referred to as a state in which S2 is ON.

Next, FIGS. 2A and 2B are diagrams for describing a conventional sequence in a case where continuous shooting is performed while reducing the effects of flicker.

Prior to carrying out continuous shooting, a user points the camera at an object and maintains for a predetermined period a state in which S1 is ON. In the state in which S1 is ON, AE operations and AF operations are performed repetitively, and conditions of the object which change from moment to moment are grasped by successively performing focal point detection for the moving object to perform estimated AF, and carrying out face detection processing on images obtained by the AE sensor 111, thereby preparing for shooting.

In a state in which S1 is ON, the sequence of FIG. 2A is repeated. The sequence in FIG. 2A is referred to as an S1 sequence. In the S1 sequence, first, accumulation and reading out is performed by the AE sensor 111, and processes such as a calculation in which the brightness of an object is detected from the obtained images and a calculation in which the faces of people are detected are carried out. Furthermore, although not shown in the diagram, concurrent to the accumulation and calculation processes of the AE sensor 111, accumulation and calculation processes of the AF sensor 105 are also performed and focus adjustment operations are performed.

Figure 3A:
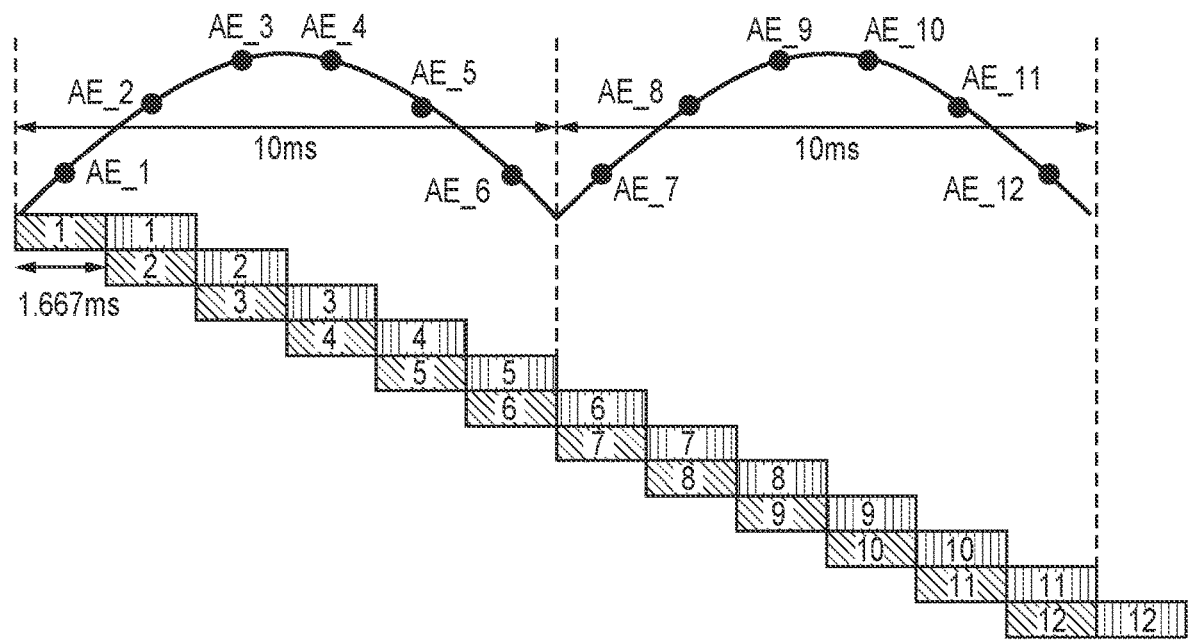
FIGS. 3A and 3B show photometric output in flicker detection operations.
Figure 3B:
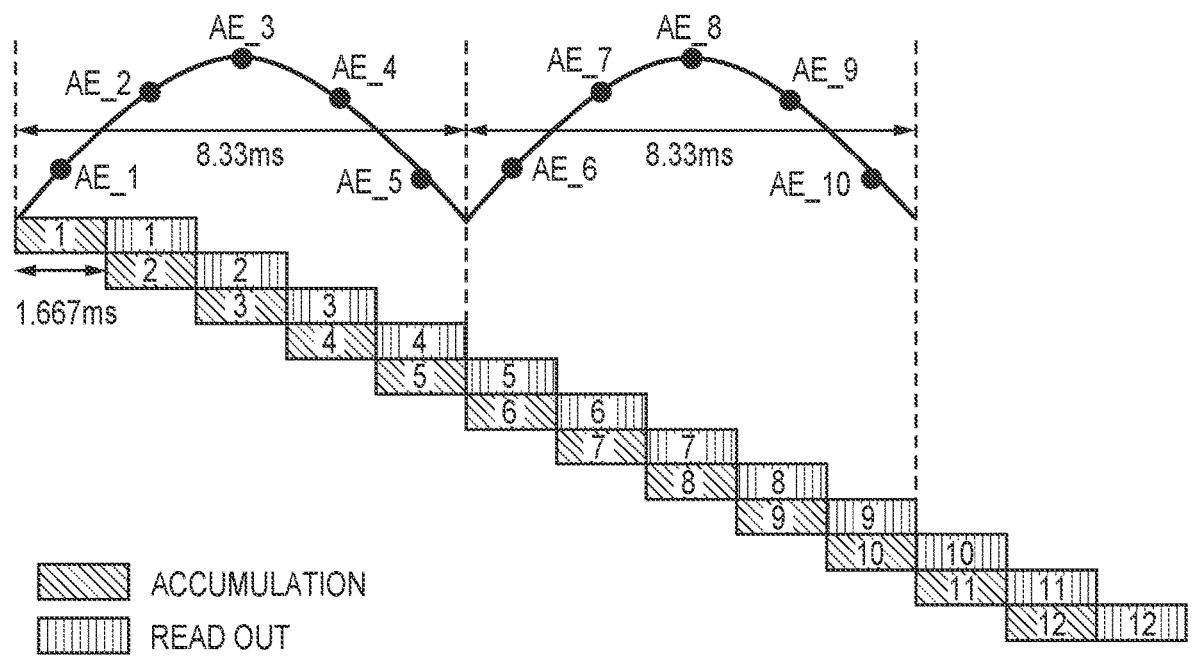

Next, accumulation is performed for detecting flicker. Description is given of a principle of flicker detection using FIGS. 3A and 3B. To detect flicker, accumulation and readout at 600 fps in a cycle of approximately 1.667 ms is performed successively 12 times as shown in FIGS. 3A and 3B. The 600 fps here is a frequency of a common multiple of the frequency (100 Hz and 120 Hz) of the flicker light source anticipated in advance. For example, accumulation control and transition of output photometric values in a case where there is a 100 Hz flicker are as shown in FIG. 3A. An n-th accumulation is stated as "accumulation n," a readout of accumulation n is stated as "readout n," and a photometric value obtained from the result of readout n is described as "AE (n)." These are listed in FIG. 3A. In regard to the timing of obtaining each of the photometric values, since accumulation is carried out in a limited time, the median value in the accumulation period is set as representative.

As the light emission cycle of 100 Hz flicker is 10 ms and 10÷1.667≈6, the same photometric values are obtained in six cycles regardless of the accumulation timing as shown in FIG. 3A. That is, a relation in which AE (n)=AE (n+6).

Similarly, with a 120 Hz flicker, as the light emission cycle is approximately 8.33 ms and 8.33÷1.667≈5, the same photometric values are obtained in five cycles as shown in FIG. 3B, this being a relation in which AE (n)=AE (n+5). On the other hand, in an environment with no flicker, AE (n) is constant regardless of n. From this, evaluation values F100 and F120 are defined respectively as:

$$F100 = \Sigma_{i=1}^{6} |AE(n) - AE(n+6)|$$

$$F120 = \Sigma_{i=1}^{6} |AE(n) - AE(n+5)|$$

and when a predetermined threshold F_th is used, the following determinations can be made.
(1) when F100<F_th AND F120<F_th is established:
→no flicker
(2) when F100<F_th AND F120≥F_th is established:
→flicker environment of light emission cycle T=10 ms (100 Hz)
(3) when F100≥F_th AND F120<F_th is established:
→flicker environment of light emission cycle T=8.33 ms (120 Hz)

Furthermore, due to panning being performed or the object moving, cases are conceivable in which both F100 and F120 exceed F_th. In such cases, the reliability of the flicker detection result can be considered low, and therefore it is preferable to regard it as a detection error and perform the detection operation again. Namely:
(4) when F100≥F_th AND F120≥F_th is established:
→detection error Whether or not there is flicker in a photographic environment, or when there is flicker, whether the base frequency is 100 Hz or 120 Hz. is determined, by carrying out the above calculations.

Figure 4:
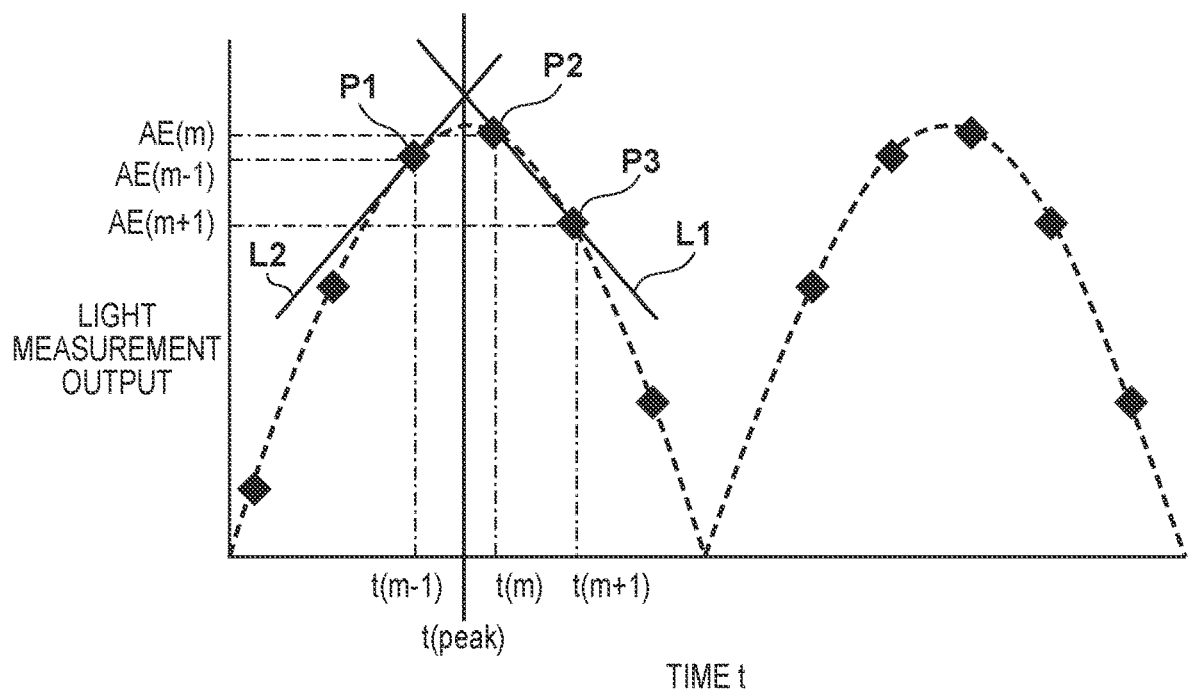
FIG. 4 is a diagram for describing a method for calculating peak timing of flicker.

In a case where the base frequency determination of flicker has finished and the frequency of flicker was determined to be 100 Hz or 120 Hz, further calculations are performed of peak timing. FIG. 4 is a diagram for describing one example of a method for calculating peak timing of flicker.

A point where the largest output among AE(1) to AE(12) in FIG. 4 is obtained is given as P2($t$ (m), AE (m)) as shown in FIG. 4, and a point of the photometric result one prior to this is given as P1($t$ (m−1), AE(m−1)) and a point of the photometric result one after this is given as P3($t$ (m+1), AE(m+1)). First, a straight line that passes through the two points of the smaller point of AE(m−1) and AE(m+1) (P3 in the example of FIG. 4) and the point P2 is obtained as L1=at+b. Further still, a straight line of a gradient—a that passes through the larger point of AE(m−1) and AE(m+1) (P1 in the example of FIG. 5) is obtained as L2. When an intersection point of the obtained L1 and L2 is calculated, a flicker peak timing tpeak can be calculated approximately.

It should be noted that in a case where the point at which the largest output among AE(1) to AE(12) is obtained is AE(1) or AE(12), an AE(0) or an AE(13) is necessary for calculating tpeak, and therefore it is considered that tpeak cannot be calculated. However, since the base frequency is already known, in a case of a flicker of 100 Hz for example, substitution is possible using AE(0)=AE(6) and AE(13)=AE (7) from the relation of AE(n)=AE(n+6). Similarly, in a case of a flicker of 120 Hz for example, substitution is possible using AE(0)=AE(5) and AE(13)=AE(8) from the relation of AE(n)=AE(n+5). For this reason, it is possible to calculate the peak timing no matter whether P2 is any point from AE(1) to AE(12).

As described above, in the accumulation, readouts, and calculations for flicker detection in FIG. 2A, a determination of the base frequency of flicker and a calculation of the moment of peak timing are calculated.

Next, description is given regarding continuous shooting operations in FIG. 2B. After the user has held S1 to ON, continuous shooting starts by the ON of S2. While S2 is ON, the operation of FIG. 2B is repeated. Description is given regarding this sequence.

When S2 is made ON, first, the main mirror 103 and the sub mirror 104 retract to outside the photographic optical path (mirror up), and photographic conditions are determined based on the AE and AF results prior to S2 coming ON, and exposure is performed. In the event of exposure, the exposure timing is adjusted based on the peak timing t (peak) of flicker detected immediately prior to S2 coming ON and the base frequency of flicker that has been determined. That is, in the case of 100 Hz flicker, the peaks come at 10 ms intervals, and therefore timings by which an integer multiple of 10 ms is added to t(peak) with N as an arbitrary integer of 1 or more:

$$t(\text{peak}) + 10 \cdot N \text{ ms}$$

and in the case of 120 Hz flicker, the peaks come at 8.33 ms intervals, and therefore:

$$t(\text{peak}) + 8.33 \cdot N \text{ ms}$$

are the flicker peaks. Thus, the time is adjusted so as to match these timings and the focal plane shutter 107 is caused to travel to perform exposure, thus enabling an image to be obtained in which the effect of flicker is reduced.

After exposure is completed, the main mirror 103 and the sub mirror 104 are again made to tilt (mirror down) on the photographic optical path, after which the same processes as in FIG. 2A are performed, namely AE accumulation, read out→AE calculation→flicker detection accumulation, read out→flicker calculation, for the AE and AF of subsequent photographic images. Note, however, a point of difference that in contrast to the flicker detection accumulation in FIG. 2A, which was 12 times of accumulation in a 1.667 ms interval, in the continuous shooting in FIG. 2B, there is 6 times of accumulation in a 1.667 ms interval. This is based on the thinking that since the base frequency of flicker is determined by the frequency of the commercial power source, it would be extremely rare for this to change midway during continuous shooting, and substantial change would not occur. In calculating the base frequency of flicker, a result of 12 times of accumulation is necessary to calculate the aforementioned evaluation values F100 and F120, but if only the peak timings are to be obtained, a result of 6 times of accumulation is sufficient. To make the frame speed even a little faster during continuous shooting, the peak timing is obtained with only 6 times of accumulation.

When employing a sequence in this manner in which the peak timing is detected in each frame of continuous shooting without exception, the time is short from the detected peak timing until exposure, and therefore even supposing a slightly shifted frequency such as a flicker frequency of 100.2 Hz or the like, any shift in exposure timing can be kept very slight. On the other hand, the continuous shooting frame speed is reduced by the inclusion of a flicker detection process between frames so that the continuous shooting operation is referred to as a low speed continuous shooting sequence as indicated in FIG. 2B. The above-described continuous shooting operation indicated in FIG. 2B is a conventional low speed continuous shooting sequence (first flicker reduction continuous shooting operation) where continuous shooting is performed while reducing the effects of flicker.

Here, the performing of flicker detection processing for each frame of continuous shooting is to account for cases where the flicker frequency changes slightly due to the base frequency being 100 Hz or 120 Hz. Consequently, it is assumed that in actual use, the time a user would maintain continuous shooting continually is at the longest approximately 10 seconds, and in a time of the order of 10 seconds, the power source frequency would have almost no change. In this case, if the flicker frequency can be detected with high accuracy as 100.2 Hz for example prior to starting continuous shooting (immediately prior to starting continuous shooting), then flicker detection processing in each frame becomes unnecessary, and frame speed can be improved using a high speed continuous shooting sequence (second flicker reduction continuous shooting operation) of FIG. 2C in which the flicker detection process between frames from FIG. 2B is deleted.

In this way, an aim of the present embodiment is to perform high speed continuous shooting while reducing the effect of flicker by detecting the flicker frequency with high accuracy prior to starting continuous shooting and thereby omitting the flicker detection frequency process between frames in continuous shooting. Description is given of an example of this using the flowchart of FIG. 5 and the timing chart of FIG. 6A.

When S1 is made ON (shooting start instruction) at step S102 in FIG. 5, the CPU 120 carries out AE calculation (shooting preparation operation), determination of base frequency of flicker (FLK), and detection of peak timing in S103 to S107. The processing up to this point is equivalent to the processing described using FIG. 2A, and therefore description is omitted. When the peak timing becomes known at S107, the procedure proceeds to S108.

At S108, the CPU 120 detects a precise frequency of flicker. While S1 is kept ON, the sequence of FIG. 2A is repeated continuously any number of times, and therefore a calculation result of peak timing is obtainable for each time of the sequence. In the present embodiment, an internal counter (4 byte) is provided inside the camera that counts up each microsecond, and operation is repeated in which a zero to 4,294,967,295 count up is performed, then a return is made to zero, and time control is performed according to this value.

The peak timing calculation result is obtainable as this internal counter value. For example, in a first time of the S1 sequence, it is assumed that a peak timing calculation result Peak (1) is Peak (1)=100,000 and for a second time Peak (2)=169,900 and the detection result of the base frequency of flicker at S105 is 100 Hz.

In this case, the interval of the peak of the detection result of the second time is 69,900 μs=69.9 ms. Of course, in a case where the timing of the counter reaching the largest value is sandwiched between one peak and the next peak, it occurs that Peak (n)>Peak (n+1) with n as an arbitrary integer, and therefore in this case the peak interval is obtained in consideration of the amount of counter reset as Peak (n+1) =Peak (n+1)+$2^{32}$. Since the base frequency is 100 Hz, there are seven crests of flicker within this 69.9 ms, where for one crest it is 69.9÷7=9.9857 ms, that is, the precise frequency of flicker is calculated as 1,000÷9.9857=100. 1431 Hz.

However, this calculation result is obtained from the two times of peak timing calculation results of Peak (1) and Peak (2), and this includes noise in the AE sensor 111 used in detection and error factors such as interpolation error of the peak timing interpolation algorithm described using FIG. 4. Accordingly, by performing the same detection multiple number of times and performing an averaging, a more highly accurate precise frequency of flicker can be obtained.

FIG. 7 shows a chart as an example in which are listed calculation results of Peak (1) to Peak (11) and the precise frequency of flicker obtainable from these. As has already been described, the precise frequency of flicker obtainable from Peak (1) and Peak (2) is 100.1431 Hz, and similarly the precise frequency of flicker is obtained from other Peak (n) and Peak (n+1). For example, the average value of 10 precise frequencies of flicker obtained from 11 times of peak timing calculation results is 100. 1378 Hz in the example of this chart, which is more accurate than the frequency obtained from only the first and second times. Assuming the premise that the frequency of flicker does not change in the order of a time of approximately 10 seconds, the precision of detecting the frequency of flicker is improved by averaging more data within a ten second period.

On the other hand, time is required to accumulate results of many Peak (n), and a time of 750 ms is required to accumulate 11 times of peak timing results in the example of FIG. 7, which is the difference between Peak (1) and Peak (11). In this way, in the processing of S108, the accuracy of the detected precise frequency of flicker improves in accordance with the time spent on processing, and the time spent on detection is given as FLK_D_T. It should be noted that the power source frequency changes in the order of a long time, and therefore results of Peak (n) to be accumulated internally are limited for example to an amount 10 seconds prior to the latest, and results older than the prior 10 seconds may be deleted. In this case, the maximum value of FLK_D_T becomes 10 seconds.

Once S2 is made ON at S109 after repeating the S1 sequence, the CPU 120 proceeds to S110, which is a sequence for actual shooting.

At S110, the CPU 120 determines the length of the time FLK_D_T spent on flicker detection. As described earlier, the precise frequency of flicker calculated at S108 has a characteristic in that accuracy improves for greater lengths of time spent on detection. Here, description is given using FIGS. 8A and 8B concerning how an image is affected by the accuracy of the flicker frequency that is detected.

Now, presume a case in which the true flicker frequency of a light source is 100.1 Hz and the detected frequency is right on 100 Hz, which is a difference of 0.1% with respect to the true value. With the last detected peak timing prior to starting shooting as t (peak), upon proceeding from there to shooting when S2 is made ON, approximately 80 ms is spent from preparation for shooting such as mirror raising and the like until preparation enabling the shutter to travel is completed. In this case, as shown in FIG. 8A, if control is performed so that the shutter travels with a timing 89.91 ms after 9 crests from t (peak), then exposure is synchronized with the flicker peak and an image can be obtained in which the effect of flicker is reduced.

Figures 8A, 8B:
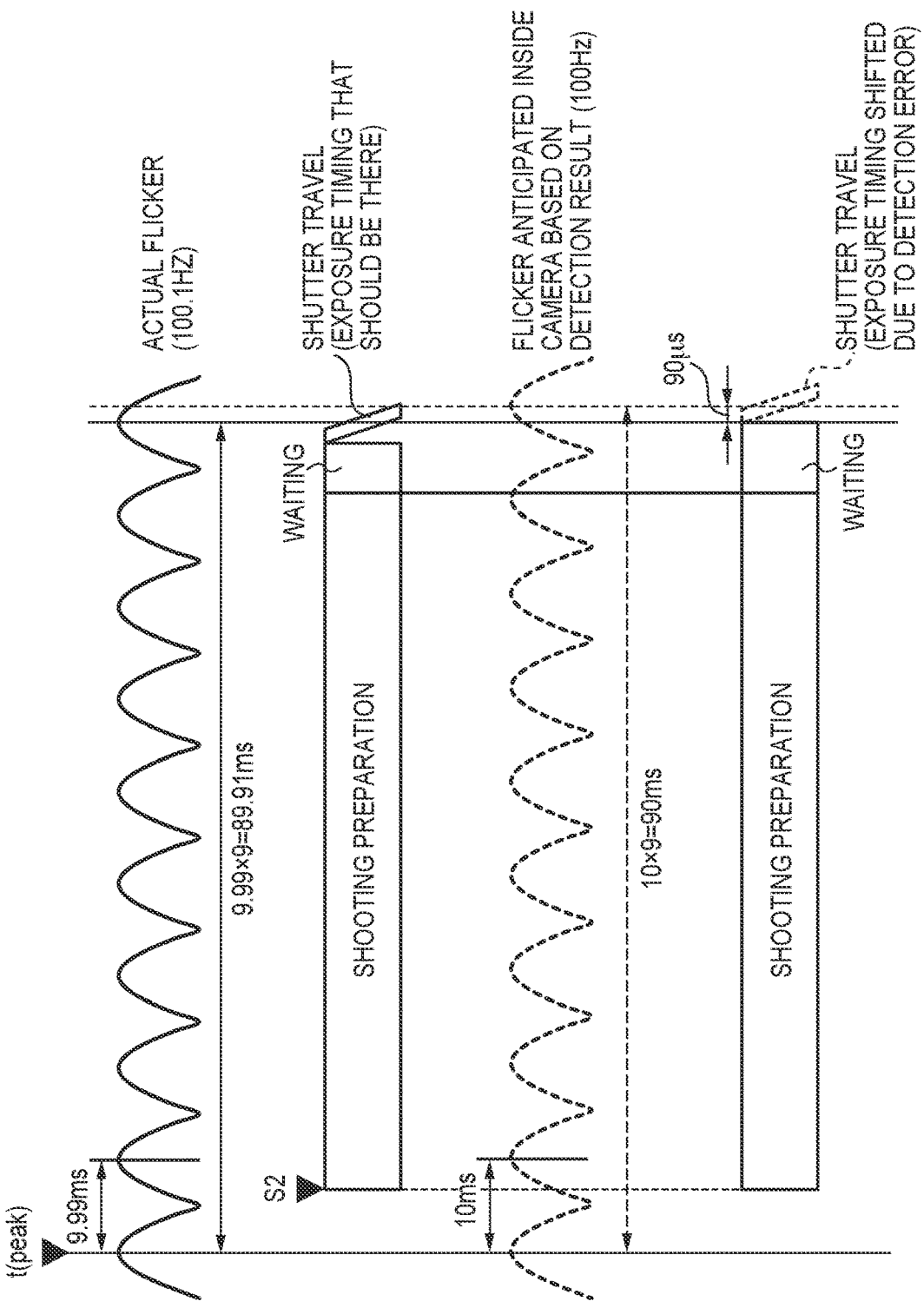
FIGS. 8A and 8B show timings in cases where there is error in the detected flicker frequency.

On the other hand, inside the camera a flicker frequency right on 100 Hz is detected and assumed, and therefore, in fact, as shown in FIG. 8B, the shutter travels synchronized after 90 ms oft (peak), such that exposure is inadvertently performed with a timing approximately 90 us later than the timing that it should be.

The example of FIGS. 8A and 8B is a chart where approximately 90 ms has elapsed after t (peak), but in a case where a high speed continuous shooting sequence is maintained like this for one second for example, since the detection difference is 0.1%, unfortunately the shutter travels with a timing approximately 1 ms later.

Figure 9A:
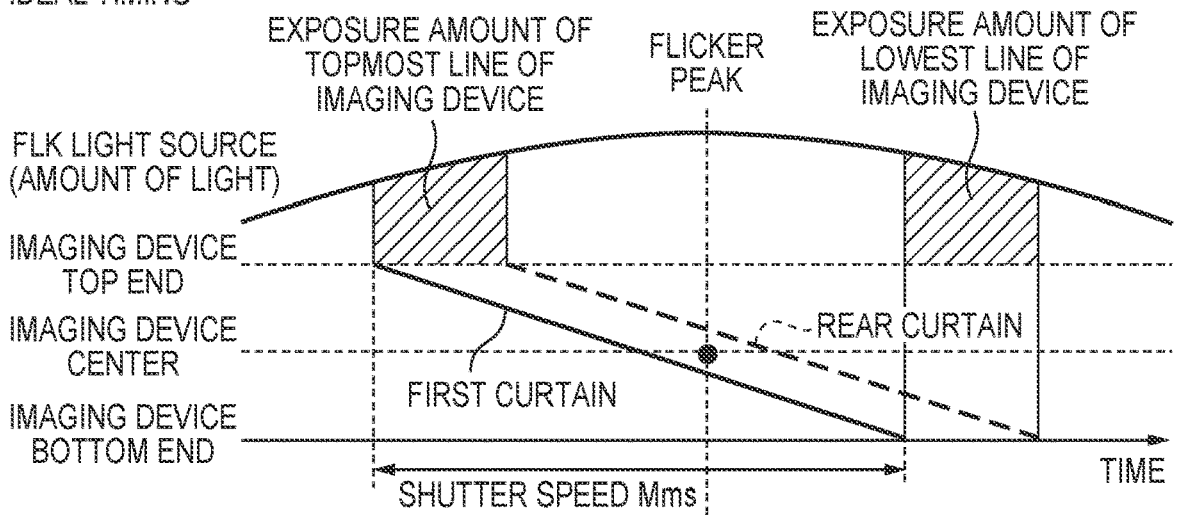
FIGS. 9A to 9C are diagrams for describing images obtained in cases where there is error in the shutter travel timing.
Figure 9B:
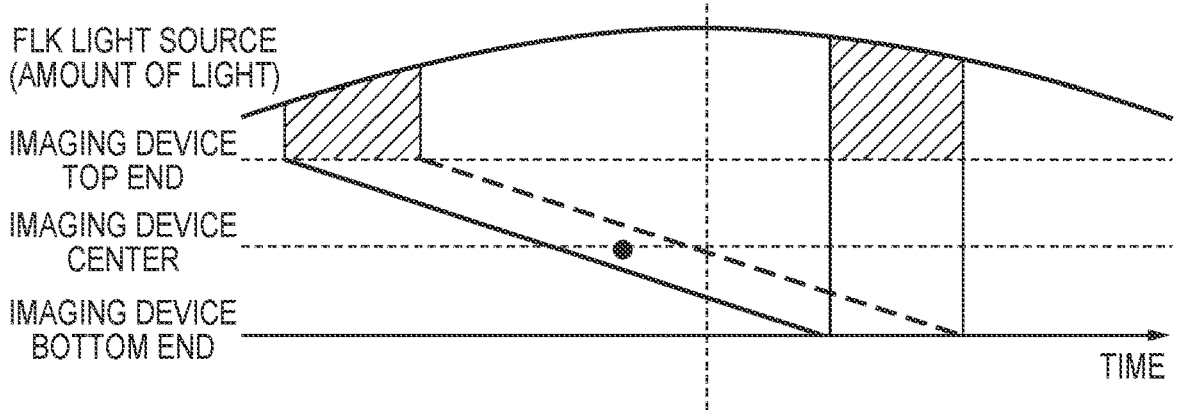
Figure 9C:
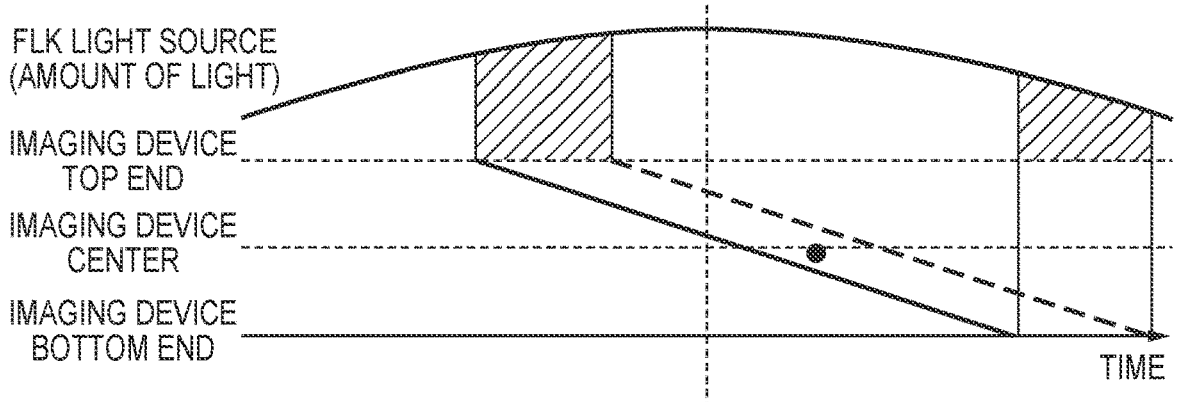

Next, description is given using FIGS. 9A to 9C regarding the effects on an image in a case where the timing of shutter travel has shifted from the peak of flicker. FIG. 9A is a diagram of a relationship between peak timing of flicker and shutter travel timing in a case where exposure is performed with an ideal shutter travel timing. Here, the focal plane shutter 107 travels in a direction from top toward bottom in FIG. 1 and its shutter speed is given in Mms.

With the ideal timing of FIG. 9A, the exposure amounts at the top end and bottom end of the imaging device 108 are equal, and the exposure amount at the center line is the brightest. Although the top and bottom ends become slightly darker than the center line where it is brightest, the change in brightness is small in the vicinity of the peak of flicker, and therefore brightness disparities within the image can be kept to a minimum and an image can be obtained in which the effect of flicker is reduced.

On the other hand, FIG. 9B shows a case in which the shutter travels earlier than the true flicker peak. In this case, the exposure amount at the top end of the imaging device 108 becomes darker, and conversely the exposure amount at the bottom end becomes brighter. The effect of flicker affects the image when there is a large brightness disparity between the top and bottom of the image surface. Similarly, FIG. 9C shows a case in which the shutter travels later than the true flicker peak, and although the occurrence of brightness is reversed compared to the case of FIG. 9B, there is still a large brightness disparity between the top and bottom of the image surface.

In other words, it is evident that when the shutter travel timing is shifted, the difference between the exposure amounts at top end and the bottom end of the image surface becomes larger. So if a tolerance amount of difference between top and bottom exposure amounts can be known along with the shutter curtain speed and amplitude of brightness of the flicker light source, then an allowed shutter travel timing shift can also be calculated. For example, assume the most basic scenario in which a tolerance amount of difference between top and bottom exposure amounts is one gradient, a curtain speed M is 3 ms, a fastest shutter speed is ¼₀₀₀ seconds, and flicker fluctuates according to a |Sin| function. In this case, tolerance widths can be calculated in a range of ±1.847 ms for the targeted timing with 100 Hz flicker, and ±1.285 ms for 120 Hz flicker. The speed of contrast fluctuation is faster for 120 Hz flicker than 100 Hz flicker, and therefore a stricter tolerance width is necessitated.

Next, description is given regarding a requisite detection accuracy of flicker frequency. Now, consider that for 10 seconds after start of continuous shooting, capture can be achieved with a difference in the number of gradients of contrast between the top and bottom of the image surface is one gradient or less. When considering 120 Hz flicker, whose tolerance width for shift in shutter travel timing is severe, the tolerance width for timing shift is ±1.285 ms. A shift of ±1.285 ms after 10 seconds is a case where the frequency detection error is 0.01285%. That is, it is sufficient for the precise frequency of flicker calculated at S108 to be within ±0.01285%.

Here, consider the relationship between the time spent on calculating the precise frequency of flicker at S108 and the accuracy of the precise frequency that is detected. As described earlier, the calculation result of Peak (n) includes noise in the AE sensor 111 used in detection and error factors such as interpolation error of the peak timing interpolation algorithm described with FIG. 4. Accordingly, a relationship between the time spent on detection and a standard deviation of detected frequency is measured in advance with a basic flicker light source whose light intensity changes with a |Sin| function of constant frequency.

With the camera of the present embodiment, a standard deviation σ of detected frequency obtainable in a case where 150 ms of detection time has been spent in regard to a frequency true value 120 Hz flicker is assumed to be 0.016. When the variation width is given as 3σ, a case is assumed where the detected frequency is shifted by 0.048 Hz at worst, thus 120±0.048 Hz. This means that there is an error of 0.04% at worst. When the detection time is doubled, the variation becomes half, and assuming a detection time of two times 300 ms, the frequency detection error in this event becomes 0.02% at worst. The requisite accuracy is ±0.01285%, and therefore it is evident from this result that when 467 ms or longer (predetermined time or longer) is spent on detection, a frequency with an error (calculation accuracy) equal to or less than the requisite accuracy can be obtained.

A time FLK_D_T to be spent on flicker detection, which is necessary for keeping within the requisite accuracy, is obtained according to various parameters such as an allowed difference in the number of gradients of contrast between the top and bottom of the image surface, shutter speed, the anticipated time of maintained continuous shooting, and the relationship between the time spent on frequency detection and detection accuracy. In the example here it was evident that a desired accuracy could be obtained with a detection time of 467 ms or longer, but depending on conditions that are anticipated, this value of 467 ms changes variously. Accordingly, lengths of required FLK_D_T for obtaining a requisite accuracy are obtained in advance as A ms.

Returning to the description of FIG. 5, at S110, the CPU 120 determines whether or not the time FLK_D_T spent on flicker frequency detection is longer than a predetermined time A. In a case where it is longer, the desired accuracy can be obtained, and therefore the high speed continuous shooting sequence repeats at S111 until S2 is made OFF. On the other hand, in a case where FLK_D_T is shorter than the predetermined time A, the desired frequency detection accuracy is not being obtained, and therefore the S1 sequence is repeated until the detection time reaches A, and once the predetermined time A has reached A, an operation is performed in which the procedure transitions to the high speed continuous shooting sequence S111.

It should be noted that FLK_D_T≥467 ms is satisfied at the time where high speed continuous shooting starts at S111, and it may be configured that how many seconds from here until an image having a difference in the number of gradients of contrast between the top and bottom of the image surface within one gradient can be obtained is calculated in accordance with the length of FLK_D_T, and displayed to the user during continuous shooting. Alternatively, a countdown may be performed in response to the continuation of continuous shooting. If FLK_D_T=467 ms, this is 10 seconds, and in a case where the user continues with S1 as ON for longer, this is a value of 10 seconds or longer.

At S112, the CPU 120 repeats high speed continuous shooting while S2 is maintained ON, then the sequence finishes when S2 is OFF.

The foregoing was a description of an operation flowchart of the first embodiment, and FIG. 6A illustrates this in the form of a simplified timing chart. The flicker detection operation repeats when S1 is turned ON, and in a case where even if S2 is turned ON but the flicker detection time FLK_D_T has not reached the predetermined time A ms required to obtain the requisite accuracy, which has been calculated in advance, the start of continuous shooting is delayed. At the time point where the flicker detection time FLK_D_T has become longer than the predetermined time A, photography starts with the high speed continuous shooting sequence given that the flicker detection accuracy has reached the requisite accuracy.

It should be noted that whether only the conventional low speed continuous shooting sequence is to be executed, or whether both the low speed continuous shooting sequence and the high speed continuous shooting sequence are to be used such that these are switched, may be configured to be switched by the user.

Second Embodiment

Figure 10:
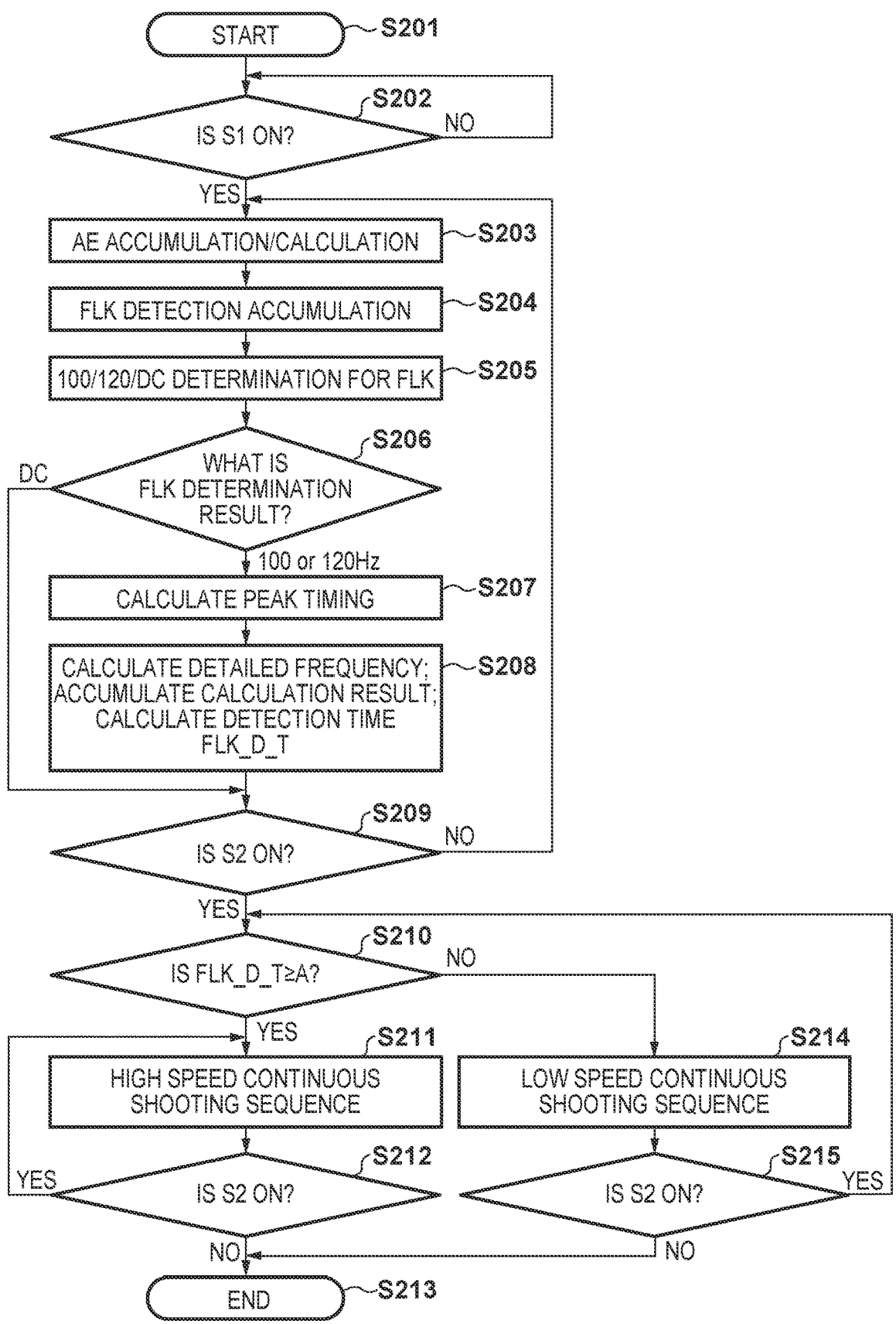
FIG. 10 is a flowchart showing a continuous shooting operation in a second embodiment.

Next, description is given of a second embodiment of an image capturing apparatus with reference to the flowchart of FIG. 10 and FIG. 6B. The configuration of the digital single lens reflex camera of the second embodiment is the same as the configuration of the first embodiment shown in FIG. 1.

S201 to S209 in the flowchart of FIG. 10 are the same as S101 to S109 in FIG. 5, and therefore description thereof is omitted.

A difference of the second embodiment from the first embodiment is a sequence in a case where FLK_D_T<A at S210 and the requisite accuracy of flicker frequency detection is not satisfied (the flicker detection time is less than the predetermined time). In the first embodiment, even when S2 was turned ON, the procedure did not proceed to the continuous shooting sequence, but waited until FLK_D_T≥A was satisfied (repeating the S1 sequence). In this case, even when S2 was turned ON, photographing did not start, and therefore there is a possibility that the user would be confused. Accordingly, in the second embodiment, in a case where FLK_D_T<A at S210, the requisite accuracy is not satisfied, and therefore the CPU 120 performs control such that the procedure proceeds to the conventional low speed continuous shooting sequence S214. In the low speed continuous shooting sequence, as shown in FIG. 2B, a process is performed of detecting the peak timing of flicker between frames. For this reason, even when continuous shooting starts at S214, the results of peak timing are accumulated continuously and FLK_D_T≥A becomes satisfied with the passing of time. Thus, at first continuous shooting starts with the low speed continuous shooting sequence S214 until FLK_D_T≥A is satisfied, after which a transition is made to the high speed continuous shooting sequence S211.

FIG. 6B expresses this in a timing chart. In a case where, after repeating the S1 sequence, S2 is turned ON while FLK_D_T<A, continuous shooting starts with the low speed continuous shooting sequence and the peak timings continue to be obtained, and after FLK_D_T≥A becomes satisfied, a transition is made to the high speed continuous shooting sequence. In this case, although initially at low speed, the user is not confused because continuous shooting starts immediately after S2 becomes ON.

Third Embodiment

Figure 11:
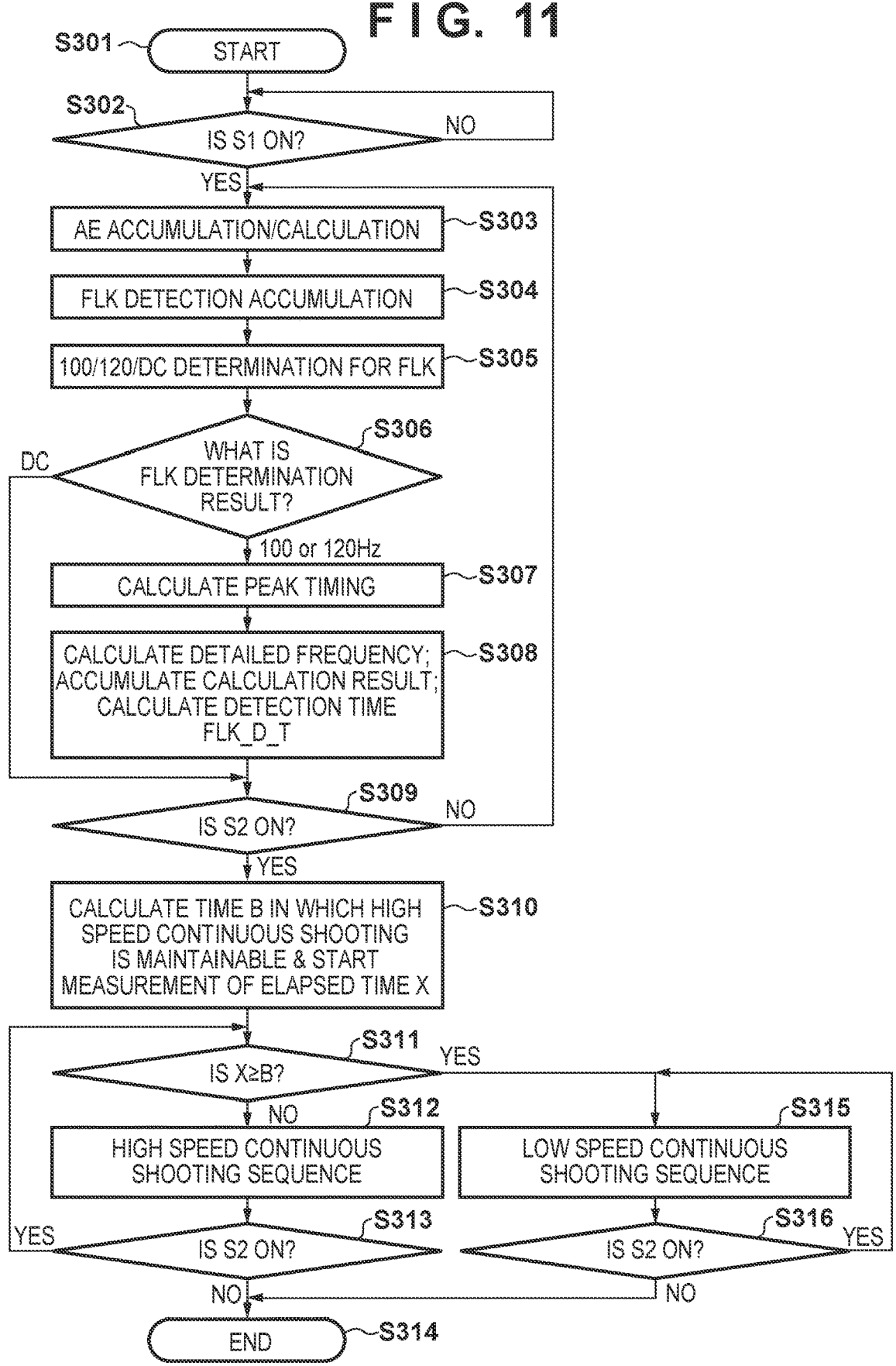
FIG. 11 is a flowchart showing a continuous shooting operation in a third embodiment.

Next, description is given of a third embodiment of an image capturing apparatus according to the present invention with reference to the flowchart of FIG. 11 and FIG. 6C.

The configuration of the digital single lens reflex camera of the third embodiment is the same as the configuration of the first embodiment shown in FIG. 1.

S301 to S309 in the flowchart of FIG. 11 are the same as S101 to S109 in FIG. 5, and therefore description thereof is omitted.

In the third embodiment, upon S2 turning ON at S309, the CPU 120 calculates at S310 a time B in which high speed continuous shooting is maintainable. In the first embodiment, so as to satisfy a desired frequency detection accuracy, it was ensured without exception that FLK_D_T was equal to or greater than A, after which a transition was made to the high speed continuous shooting sequence. On the other hand, in the third embodiment, the detection accuracy is calculated in accordance with the length of FLK_D_T at the time point when S2 is turned ON, and an inverse calculation is performed of the time in which the high speed continuous shooting sequence can be maintained (continuation capability time). The operation of the first embodiment and the operation of the third embodiment are switchable according to the user performing settings.

For example, assume S2 is turned ON at the time point when FLK_D_T=150 ms. As described in the first embodiment, the standard deviation σ of the flicker detection frequency when FLK_D_T=150 ms is 0.016, and when a variation width of 3σ is assumed, this results in at worst 120±0.048 Hz with an error of 0.04%. For this error to be within the shutter travel timing tolerance width of ±1.285 ms, which is within one gradient difference of the number of top to bottom gradients of brightness in an image in a case of 120 Hz flicker, an inverse calculation can be performed such that 1.285÷0.0004=3,212 ms and the desired accuracy can be kept given approximately 3.2 seconds. In this way, at S310, the CPU 120 calculates a time B in which high speed continuous shooting is maintainable in accordance with the length of FLK_D_T. At S311 to S316, the high speed continuous shooting sequence S312 is performed for the period of the initial time B, and after the time B has elapsed, a process is performed in which a switch is made to the low speed continuous shooting sequence S315. The time B may be displayed with a countdown upon the start of high speed continuous shooting so that the user will be aware of the timing of the switch to low speed continuous shooting.

In the third embodiment, continuous shooting operations start immediately when S2 is turned ON, and therefore the user is not confused, and unlike the second embodiment, this is initially with high speed continuous shooting and then low speed continuous shooting. Excluding cases where continuous shooting is maintained for extremely long times, in actual use there are cases where continuous shooting finishes before switching to low speed continuous shooting, and therefore there is the merit that high speed continuous shooting can be used more often without the user being aware.

FIG. 6C expresses this in a timing chart. This is a sequence in which the time B in which high speed continuous shooting is maintainable is calculated in accordance with the length of time the S1 sequence is repeated until S2 is turned ON, and high speed continuous shooting is maintained for the period of B, after which a transition is made to low speed continuous shooting.

It should be noted that while the S1 sequence is being executed, the time B in which high speed continuous shooting is maintainable becomes longer along with the passing of time, and therefore this may be configured such that the length of B is displayed to the user as a count-up while the S1 sequence is being executed.

Fourth Embodiment

Figure 12A:
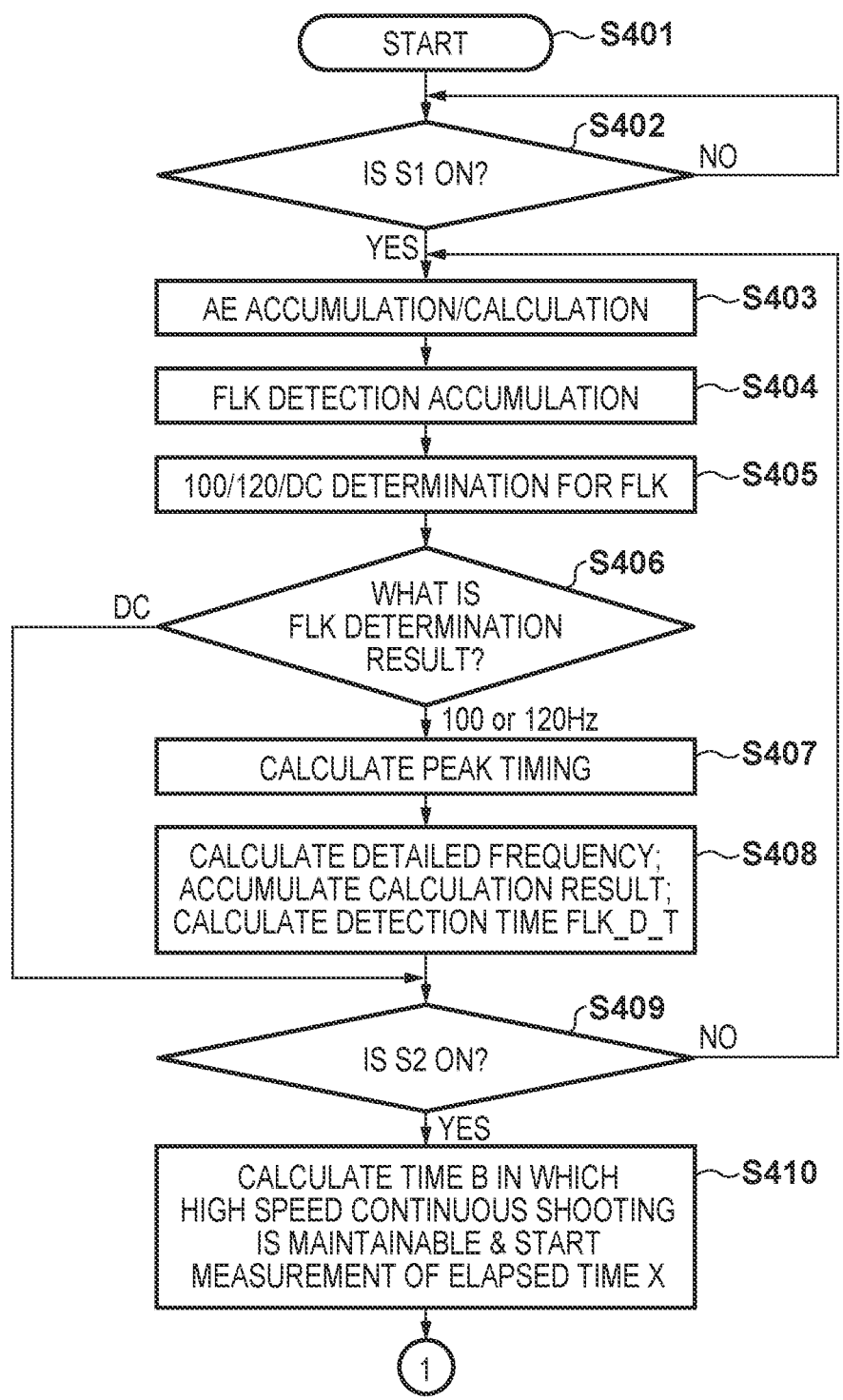
FIGS. 12A and 12B are flowcharts showing a continuous shooting operation in a fourth embodiment.
Figure 12B:
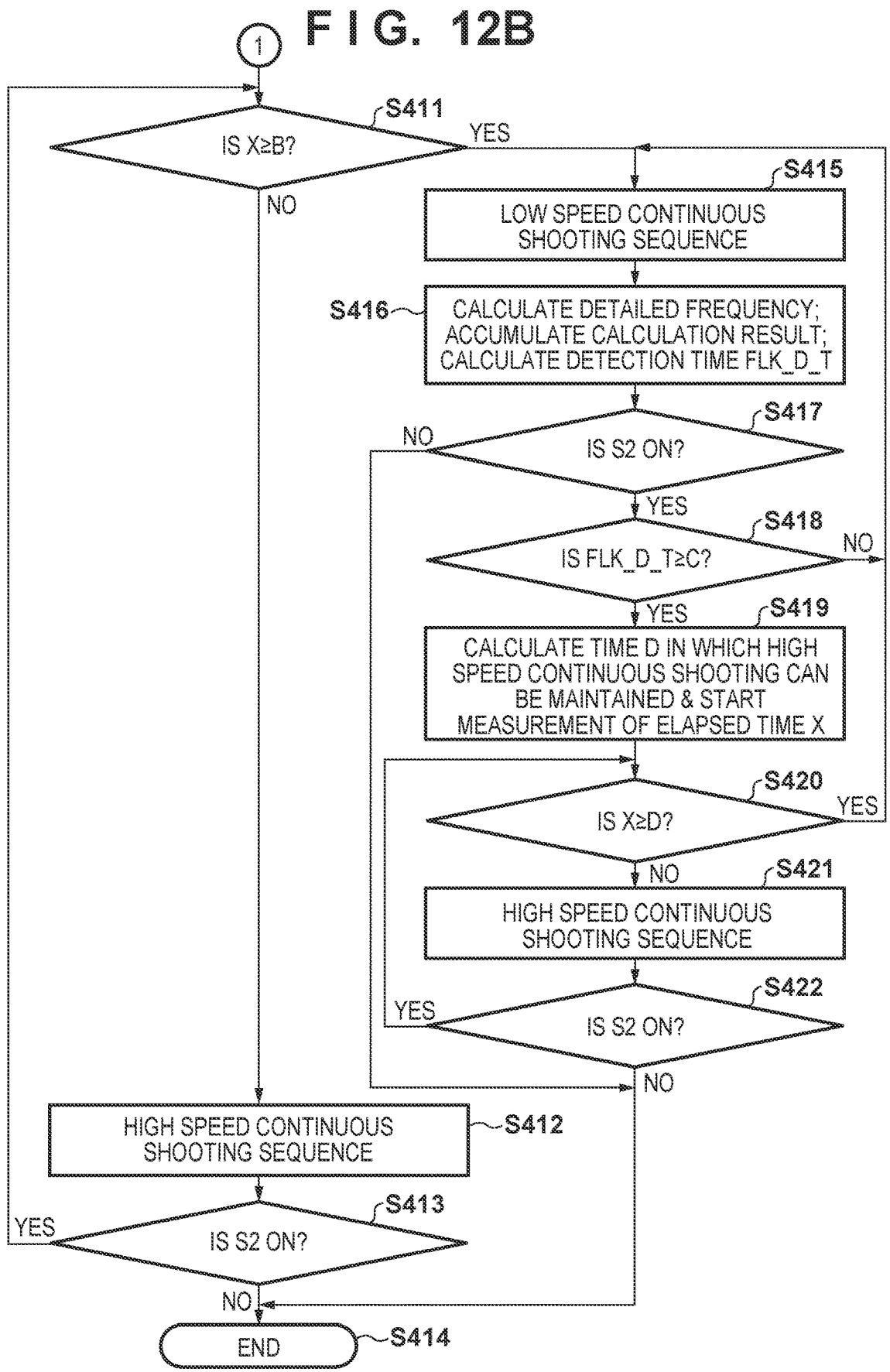

Description is given of a fourth embodiment of an image capturing apparatus according to the present invention with reference to the flowchart of FIGS. 12A, 12B and FIG. 6D. The configuration of the digital single lens reflex camera of the fourth embodiment is similar to the configuration of the first embodiment shown in FIG. 1.

The operation of the fourth embodiment is the same until midway in the third embodiment, but there is a point of difference in that, in contrast to the third embodiment where a transition is made to low speed continuous shooting after the time B has elapsed after high speed continuous shooting and then the operation finishes, in the fourth embodiment, the flicker detection operation is carried out while low speed continuous shooting is performed after the time B has elapsed, after which a return is made again to high speed continuous shooting.

S401 to S415 in FIGS. 12A and 12B are the same as S301 to S315 in FIG. 11, and therefore description thereof is omitted.

When the low speed continuous shooting sequence begins at S415, the CPU 120 again begins to accumulate, inside the camera, the peak timing calculation results obtained between continuous shooting frames in low speed continuous shooting, and repeats low speed continuous shooting (S415 to S419) until the flicker detection time FLK_D_T reaches a predetermined time C. The predetermined time C, if aiming to obtain an image having a difference in the number of gradients of brightness between the top and bottom of the image surface within one gradient as in the first embodiment for example, is C=467 ms for a period of 10 seconds from detection of peak timing. A time D in which high speed continuous shooting is maintainable in this case is 10 seconds. The specific numerical values of C and D are single examples and other values may be set.

If FLK_D_T≥C is satisfied at S418, the CPU 120 calculates the time D in which high speed continuous shooting is maintainable at S419, and repeats high speed continuous shooting (S420 to S422) from here until the time D has elapsed. Operations are repeated here such that when high speed continuous shooting is performed for the time D, then the procedure returns to S415 again and peak timing detection is carried out repetitively while low speed continuous shooting is performed, and when FLK_D_T≥C is satisfied, the procedure again returns to high speed continuous shooting.

The above is expressed in the timing chart of FIG. 6D. The time B in which high speed continuous shooting is maintainable is calculated in accordance with the length of time the S1 sequence is repeated until S2 is turned ON, and high speed continuous shooting is maintained for the period of B. After this, a procedure is repeated where the peak timing results are accumulated while low speed continuous shooting is performed until FLK_D_T≥C is satisfied, then high speed continuous shooting is maintained again for the time D.

It should be noted that in the fourth embodiment, after the time B or D in which high speed continuous shooting is maintainable has elapsed, the procedure waited until FLK_D_T≥C was satisfied while performing low speed continuous shooting. However, a modified example is conceivable in which, instead of low speed continuous shooting, a simpler operation is performed of obtaining only the peak timing flicker as shown in FIG. 2D. FIG. 2D is a peak detection sequence, and is a sequence in which only the portion in which the detection of peak timing in flicker between frames is extracted from the low speed continuous shooting sequence of FIG. 2B. Six times of accumulation are performed with an interval of 1.667 ms and the peak timing is obtained from the results thereof. Accordingly, in this modified example, after the time B or D in which high speed continuous shooting is maintainable has elapsed, continuous shooting is stopped temporarily, and after repeating the peak detection sequence and waiting for FLK_D_T≥C to be achieved, high speed continuous shooting is again restarted.

Above, description was given regarding preferred embodiments of the present invention, but the present invention is not limited to these embodiments, and various modifications and alterations are possible within a scope of the purport thereof.

For example, in the embodiments described thus far, description was given of a method in which all of these embodiments used the capture results of the AE sensor 111 to detect the frequency of flicker and peak timing. However, capture results of the imaging device 108 may be used for detection of flicker.

Furthermore, a conventional low speed continuous shooting mode has a property in that the accuracy of exposure timing can be maintained no matter how long continuous shooting is maintained without the frame rate of continuous shooting changing midway. Accordingly, this may be configured such that modes are prepared that can be set by the user in relation to continuous photographing, and a mode in which high speed continuous shooting is possible as in the first to fourth embodiments, and a mode in which only conventional low speed continuous shooting applies can be switched.

Furthermore, the timing of image capturing in which the effect of flicker is reduced can be not only the peak timing of brightness of change of flicker as described above but also can be the bottom timing of brightness of change of flicker.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-105312, filed May 31, 2018 which is hereby incorporated by reference herein in its entirety.

What is claimed is:

1. An image capturing apparatus comprising:
    an image capturing device that captures a subject image,
    at least one processor or circuit configured to function as the following units:
    a flicker detection unit that along with detecting flicker of a light source, detects a cycle of change of brightness in the flicker and a peak timing, which is a timing at which brightness peaks, and
    a control unit that, according to a predetermined condition pertaining to a shooting start instruction by a user, switches between a first flicker reduction continuous shooting operation, in which, in a case where flicker is present, the image capturing device is caused to capture images in accordance with the peak timing while causing the flicker detection unit to detect the peak timing between frames in continuous shooting, and a second flicker reduction continuous shooting operation in which the image capturing device is caused to capture images in accordance with the peak timing without causing the flicker detection unit to detect the peak timing between frames in continuous shooting.

2. The image capturing apparatus according to claim 1, wherein in the second flicker reduction continuous shooting operation, the image capturing device is caused to capture images in accordance with a timing at which a time of an integral multiple of the cycle has elapsed from the peak timing detected immediately prior to start of continuous shooting.

3. The image capturing apparatus according to claim 2, wherein the predetermined condition pertaining to a shooting start instruction by the user is a length of elapsed time from the user instructing a shooting preparation operation to the image capturing device until instructing start of continuous shooting.

4. The image capturing apparatus according to claim 3, wherein the control unit switches to the second flicker reduction continuous shooting operation in a case where the elapsed time is a predetermined time or longer.

5. The image capturing apparatus according to claim 4, wherein the predetermined time is, in a case of calculating a timing at which the time of an integral multiple of the cycle from the peak timing detected immediately prior to start of the continuous shooting has elapsed, a time spent until a calculation accuracy satisfies a predetermined accuracy.

6. The image capturing apparatus according to claim 4, wherein the control unit, in a case where the elapsed time is less than the predetermined time, carries out the first flicker reduction continuous shooting operation and, after the predetermined time from a user instructing a shooting preparation operation to the image capturing device has elapsed, switches from the first flicker reduction continuous shooting operation to the second flicker reduction continuous shooting operation.

7. The image capturing apparatus according to claim 5, wherein the predetermined condition pertaining to the shooting start instruction by the user is a setting that has been performed by which the second flicker reduction continuous shooting operation starts immediately upon a start of continuous shooting being instructed by the user, and the control unit, in a case where the elapsed time is less than the predetermined time, calculates a continuation capability time of the second flicker reduction continuous shooting operation that can be carried out in a range where the calculation accuracy satisfies a predetermined accuracy.

8. The image capturing apparatus according to claim 7, wherein the control unit, after causing the image capturing device to perform the second flicker reduction continuous shooting operation for the continuation capability time, switches to the first flicker reduction continuous shooting operation.

9. The image capturing apparatus according to claim 8, wherein the control unit displays the continuation capability time on a display device.

10. The image capturing apparatus according to claim 9, wherein the control unit displays the continuation capability time being counted down on a display device.

11. The image capturing apparatus according to claim 7, wherein the control unit displays the continuation capability time being counted up on a display device in accordance with a length of the elapsed time.

12. The image capturing apparatus according to claim 1, wherein whether to use only the first flicker reduction continuous shooting operation or to use both the first flicker reduction continuous shooting operation and the second flicker reduction continuous shooting operation by switching therebetween is settable by a user.

13. A control method of an image capturing apparatus, for controlling an image capturing apparatus including an image capturing device that captures a subject image, and a flicker detection unit that along with detecting flicker of a light source, detects a cycle of change of brightness in the flicker and a peak timing, which is a timing at which brightness peaks, the method comprising:
    controlling such that, according to a predetermined condition pertaining to a shooting start instruction by a user, switching is performed between a first flicker reduction continuous shooting operation, in which, in a case where flicker is present, the image capturing device is caused to capture images in accordance with the peak timing while causing the flicker detection unit to detect the peak timing between frames in continuous shooting, and a second flicker reduction continuous shooting operation in which the image capturing device is caused to capture images in accordance with the peak timing without causing the flicker detection unit to detect the peak timing between frames in continuous shooting.

14. A non-transitory computer-readable storage medium on which is stored a program for causing to be executed on a computer a control method of an image capturing apparatus including an image capturing device that captures a subject image, and a flicker detection unit that along with detecting flicker of a light source, detects a cycle of change of brightness in the flicker and a peak timing, which is a timing at which brightness peaks, the method comprising:
    controlling such that, according to a predetermined condition pertaining to a shooting start instruction by a user, switching is performed between a first flicker reduction continuous shooting operation, in which, in a case where flicker is present, the image capturing device is caused to capture images in accordance with the peak timing while causing the flicker detection unit to detect the peak timing between frames in continuous shooting, and a second flicker reduction continuous shooting operation in which the image capturing device is caused to capture images in accordance with the peak timing without causing the flicker detection unit to detect the peak timing between frames in continuous shooting.

\* \* \* \* \*